June 21, 1960
E. A. CHRISTENSEN ET AL
2,941,431
MAGAZINE LOADER, PLIER TYPE, SPLIT-SHOT
APPLYING HAND TOOL
Filed Aug. 15, 1958
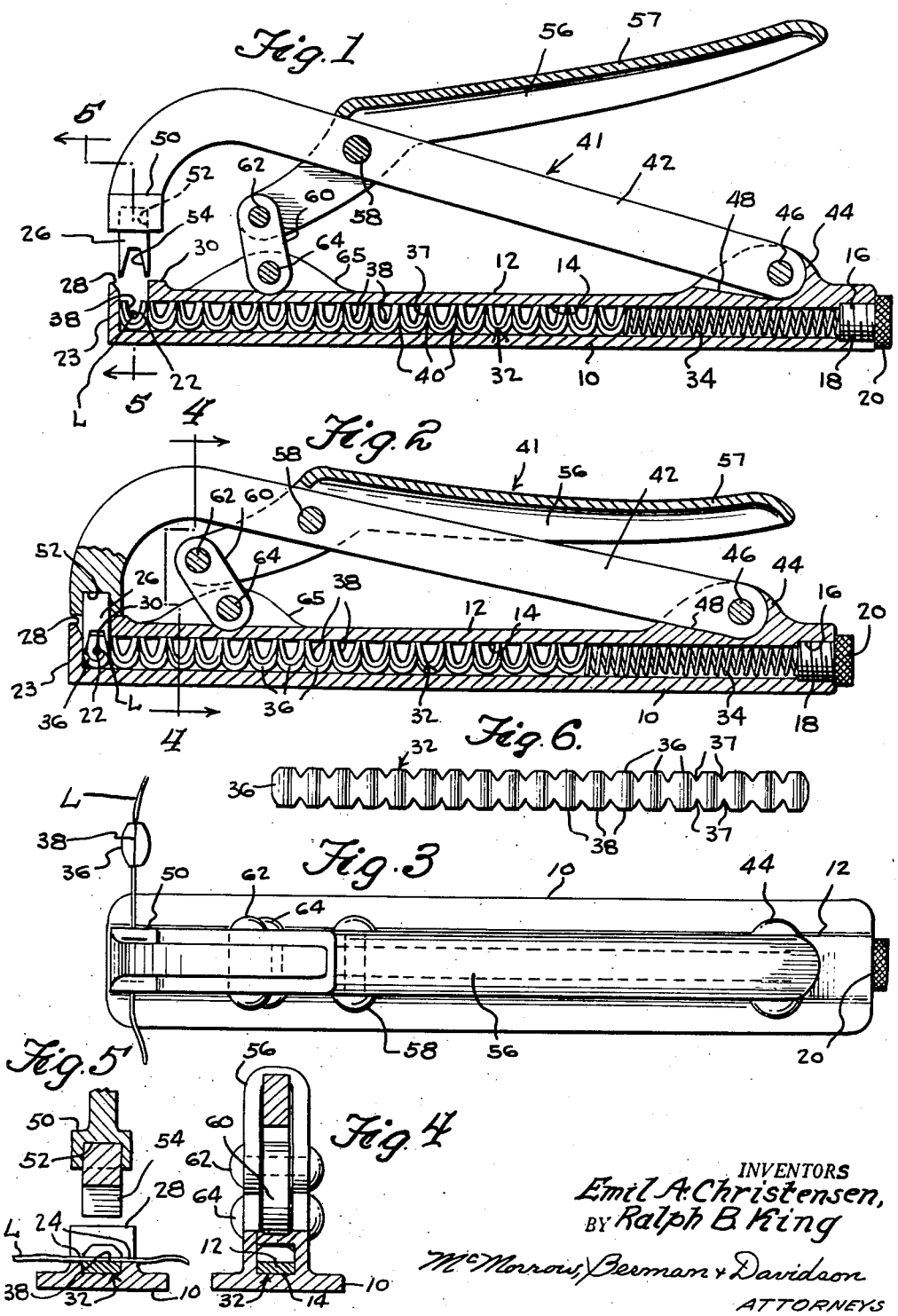
INVENTORS
Emil A. Christensen,
BY Ralph B. King
McMorrow, Berman + Davidson
ATTORNEYS

United States Patent Office 2,941,431
Patented June 21, 1960

2,941,431

MAGAZINE LOADER, PLIER TYPE, SPLIT-SHOT APPLYING HAND TOOL

Emil A. Christensen, 410 Orange St., Dunsmuir, Calif., and Ralph B. King, 716 Yama St., Yreka, Calif.

Filed Aug. 15, 1958, Ser. No. 755,172

5 Claims. (Cl. 81—15)

This invention relates generally to magazine-type dispensers. More particularly, the invention has reference to a device for dispensing split shot, and for closing said shot about a fishing line.

Devices have heretofore been conceived for applying split shot to a fishing line as a sinker. Many of these devices are of the pliers type. Others include magazines or reservoirs for the split shot, so designed that the forwardmost piece of the split shot is moved to a position to receive a line, after which the line is applied thereto.

The main object of the present invention is to provide a generally improved device of the character stated. Heretofore, the devices previously conceived for this purpose have required that the magazine be charged with separate, individual pieces of shot, or alternatively, said devices have required a relatively expensive, specially formed chain or length of connected pieces of shot. The construction heretofore devised has been relatively expensive, in this regard. One important object, accordingly, is to provide an automatic shot dispenser which will be adapted to receive, in the magazine thereof, an inexpensively formed bar the forwardmost portion of which is cut off at the same time said forwardmost portion is closed about a fishing line, whereby to form a piece of split shot, and close the same about the line, at one and the same time.

Another object is to provide a dispenser of the character stated which will be characterized by the simplicity of the design thereof.

Another object is to so form the dispenser as to cause the same to be particularly sure in operation.

Another object is to provide an automatic shot dispenser that will be capable of holding a substantial quantity of shot in relation to the compactness and overall size of the device.

Yet another object of importance is to so form the device that when the shot is clamped about the fishing line, it will be clamped very securely, without possibility of slippage or loss.

Other objects will appear from the following description, the claims appended thereto, and from the annexed drawing, in which like reference characters designate like parts throughout the several views, and wherein:

Figure 1 is a longitudinal sectional view through a dispenser according to the present invention, with the device in its normal, open position;

Figure 2 is a view like Figure 1 in which the former has been moved to a position adapted to close the forwardmost piece of split shot about the fishing line, while at the same time shearing the same off from the bar or blank from which the split shot is taken;

Figure 3 is a top plan view of the device in use;

Figure 4 is a transverse section on line 4—4 of Figure 2;

Figure 5 is a transverse section on line 5—5 of Figure 1; and

Figure 6 is a top plan view of the bar or blank from which the split shot is cut.

Referring to the drawing in detail, the device includes a flat, elongated, rectangular, base plate 10 integral on its top surface with a longitudinally and centrally extending magazine 12 having a longitudinal bore 14 of substantially rectangular cross section. Bore 14, at its rear end, is counterbored and threaded as at 16, to receive a threaded plug 18 having a knurled head 20.

At its front end, the bore 14 is in communication with an upwardly opening aperture 22 formed in the top wall of the barrel immediately in back of a front end wall 23.

Formed in the opposite side walls of the barrel, in communication with the bore and with the opening 22, are upwardly opening, transversely aligned notches 24 (Figure 5). These are adapted to receive a fishing line or leader L. Thus, the fishing line or leader can be positioned over the notches and moved downwardly through the opening 22 until the line seats in the bottom of the notches as in Figure 5. The line will now extend transversely across the front end of the bore 14 in the position shown in Figures 1 and 2. In these circumstances, the line will be positioned in the upwardly opening, transverse slot of the forwardmost piece of split shot, in a manner to be described in detail hereafter.

Designated at 26 is a former or forming die, which is in the shape of a short, vertically disposed block of non-circular cross section, the lower end of which has sharpened teeth in a manner to be described hereafter. The forming die 26 is adapted to be moved downwardly through the opening 22 from its Figure 1 to its Figure 2 position, in close proximity to a beveled top edge 28 of end wall 23.

The opening 22, as will be noted from Figures 1 and 2, is formed in a boss 30 formed upon the top surface of the magazine.

Generally designated at 32 (Figures 1, 2, and 6) is an elongated, one-piece blank or bar extending within the magazine. The bar is formed of a relatively soft, heavy material such as lead. The bar is inserted through the rear end of the bore 14, after which a compression, coil spring 34 is inserted in the bore. Then, the plug is engaged in the bore and constitutes an abutment for the rear end of the spring. The front end of the spring bears against the rear end of the bar 32. The bar is thus continuously urged forwardly to locate the front end of the bar in registration with the opening 22. As a result, when the forming die 26 is moved downwardly to its Figure 2 position, it will act upon the forwardmost portion of the bar.

Referring to Figure 6, the bar comprises a plurality of identical pieces of split shot 36 connected integrally to each other. The connections are weakened through the provision of transversely aligned, deep notches 37 formed in the bar.

Each piece of shot 36 is provided, medially between the front and rear end surfaces, with a transverse, upwardly opening recess 38, into which the line L moves when the line is extended downwardly. In other words, the recess 38 is aligned with the notches 24 in use of the device as shown in Figure 5. Reference is, of course, made to the recess 38 of the forwardmost piece of split shot 36.

As seen in Figures 1 and 2, transverse, downwardly opening recesses 40 are formed in the bar, in registration with the side notches or recesses 37. This weakens the integral connection between adjacent pieces of split shot even more, so as to make it a comparatively easy matter for the forming die to cut through the weakened connection between the foremost shot 36 and the piece immediately behind the same.

Means generally designated at 41 is provided for moving the forming die from its Figure 1 to its Figure 2 position. Said means comprises a mechanical linkage including a pressure arm 42 extending longitudinally of the device forwardly from a boss 44 formed upon the rear end of the barrel. Arm 42 is connected pivotally to boss 44 by a pin 46, the arm being disposed within a forwardly, upwardly opening recess 48 of the boss.

Arm 42 at its front end has a depending extension 50 which terminates at its lower end in a generally rectangular head having in its underside a downwardly opening, rectangular recess 52 in which the forming die 26 is engaged at its upper end.

To rock the lever downwardly from its Figure 1 position, there is provided a handle 56. This is of channeled formation and has a rear end portion 57 overlying the arm 42. At its front end, the handle is bifurcated to receive the arm, and the bifurcated portion of the handle carries a pin 58 extending through the intermediate portion of the arm. At its front end, the handle is pivotally connected to a connecting link 60 by means of a pin 62. Link 60 is connected by pin 64 to the magazine, within a slotted boss 65 integrally formed upon the top wall of the magazine.

When the channeled distal portion 57 of the handle is moved downwardly from its Figure 1 position, it rocks downwardly, the front end portion of the arm, with the forming die having a straight line movement, by reason of the particular connection including the pivotal connection 58, and link 60 having pivotal connections 62, 64 to the handle and barrel respectively. A certain amount of looseness of the fit of the forming die in the opening is permitted, in this connection, so that no problems result from the fact that the front end of the arm 42 travels in an arcuate path about the axis defined by the pin 46.

The die 26 is formed with teeth 54 at its lower end, said teeth being progressively reduced in thickness and terminating at their lower ends in sharpened edges extending transversely of the barrel. The tooth 54 shown at the right in Figure 1 is of main importance, since it extends downwardly at the back of the forwardmost split shot 36, severing said split shot from the shot 36 immediately in back of the same.

The teeth have downwardly divergent, confronting inner surfaces, this being of importance because when the forming die moves downwardly, said inner surfaces engage opposite surfaces of the forwardmost split shot 36. As a result, when the split shot is severed from the shot immediately in back of the same, it is at the same time closed at its top over the line L by the wedging or cam action of the confronting, downwardly divergent faces of the teeth 54. This is shown in Figure 2. It will be seen from this figure that the forming die has moved downwardly. As the forming die moves downwardly through opening 22, the right hand tooth 54 in this figure cuts off the foremost shot 36. At the same time, both teeth exert a cam action against the front and back surfaces of the foremost split shot causing the walls of the transverse slots 38 of said foremost piece to be moved toward each other and closed tightly over the line L.

In this way, the foremost shot is severed from the bar or blank simultaneously with being clamped tightly to the line.

Now, the handle is raised. In this connection, any suitable spring means, not shown, could be employed for returning the handle 56 and arm 42 to their normal Figure 1 position, as will be readily understood.

In any event, when the handle is raised, the forming die moves upwardly and one may now pull the line in the direction of its length, transversely of the device. The shot 36 which has been severed and then clamped about the line moves out of the barrel in a sidewise, upward movement, locating an adjacent portion of the line in the barrel, in the slot 38 of the next shot 36 that is to be cut off. In other words, as the previously cut off shot is moved out of the barrel, spring 34 expands to advance the entire bar and locate a new piece of split shot in position to receive the line in its slot 38.

It will be seen that the device permits shot to be swiftly and easily clamped about a line L, by a novel relationship and formation of the parts. A further important characteristic resides in the fact that the bar 32 can be inexpensively formed, and is itself quite strong and not subject to accidental breakage even when subjected to comparatively rough handling.

A further important characteristic of the invention resides in the fact that to position fresh portions of the line for clamping of split shot thereabout, requires little effort and movement of the line. In other words, the line can have shot clamped thereto at a plurality of locations along the length thereof, merely by advance of the line transversely of the front end of the barrel to remove a clamped shot while at the same time locating the line in position to be clamped by the next adjacent shot.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A dispenser for split shot comprising an elongated magazine adapted to contain a length of bar material from which split shot is to be severed; means for advancing said length of bar material toward one end of the magazine, said end of the magazine having an opening in which is exposed the forwardmost portion of said length of bar material; a forming die disposed in position to move inwardly through said opening to sever said length of bar material to form a split shot, said forming die being adapted to close the cutoff shot about a fishing line; and means for advancing the forming die through the opening, said forming die having depending, spaced teeth, one of said teeth being adapted to sever said length of bar material to produce the split shot, said teeth being adapted for closing the severed split shot about a fishing line.

2. A dispenser for split shot comprising an elongated magazine adapted to contain a length of bar material from which split shot is to be severed; means for advancing said length of bar material toward one end of the magazine, said end of the magazine having an opening in which is exposed the forwardmost portion of said length of bar material; a forming die disposed in position to move inwardly through said opening to sever said length of bar material to form a split shot, said forming die being adapted to close the cutoff shot about a fishing line; and means for advancing the forming die through the opening, said forming die having depending, spaced teeth, one of said teeth being adapted to sever said length of bar material to produce the split shot, said teeth being adapted for closing the severed split shot about a fishing line, the teeth having confronting, downwardly divergent surfaces engaging the cutoff split shot to close the split shot about the line.

3. A dispenser for split shot comprising an elongated magazine adapted to contain a length of bar material from which split shot is to be severed; means for advancing said length of bar material toward one end of the magazine, said end of the magazine having an opening in which is exposed the forwardmost portion of said length of bar material; a forming die disposed in position to move inwardly through said opening to sever said length of bar material to form a split shot, said forming die being adapted to close the cutoff shot about a fishing line; and means for advancing the forming die through the opening, said forming die having depending, spaced teeth, one of said teeth being adapted to sever said length of bar material to produce the split shot, said teeth being adapted for closing the severed split shot about a fishing line, the teeth having confronting, downwardly divergent surfaces engaging the cut off split shot to close the split shot about the line, said teeth extending transversely of the magazine.

4. A dispenser for split shot comprising an elongated magazine adapted to contain a length of bar material from which split shot is to be severed; means for advancing said length of bar material toward one end of the magazine, said end of the magazine having an opening in which is exposed the forwardmost portion of said length of bar material; a forming die disposed in position to move inwardly through said opening to sever said length of bar material to form a split shot, said forming die being adapted to close the cutoff shot about a fishing line; and means for advancing the forming die through the opening, said forming die having depending, spaced teeth, one of said teeth being adapted to sever said length of bar material to produce the split shot, said teeth being adapted for closing the severed split shot about a fishing line, the teeth having confronting, downwardly divergent surfaces engaging the cut off split shot to close the split shot about the line, said teeth extending transversely of the magazine, the magazine having transversely aligned, upwardly opening notches adapted to receive said fishing line, to hold the fishing line in proper position during movement of the forming die through the opening.

5. A dispenser for split shot comprising an elongated magazine adapted to contain a length of bar material from which split shot is to be severed; means for advancing said length of bar material toward one end of the magazine, said end of the magazine having an opening in which is exposed the forwardmost portion of said length of bar material; a forming die disposed in position to move inwardly through said opening to sever said length of bar material to form a split shot, said forming die being adapted to close the cutoff shot about a fishing line; and means for advancing the forming die through the opening, said forming die having depending, spaced teeth, one of said teeth being adapted to sever said length of bar material to produce the split shot, said teeth being adapted for closing the severed split shot about a fishing line, the teeth having confronting, downwardly divergent surfaces engaging the cut off split shot to close the split shot about the line, said teeth extending transversely of the magazine, the magazine having transversely aligned, upwardly opening notches adapted to receive said fishing line, to hold the fishing line in proper position during movement of the forming die through the opening, said teeth being disposed at opposite sides of said notches for disposition of the line between the teeth.

References Cited in the file of this patent

UNITED STATES PATENTS

| | | |
|---|---|---|
| 286,188 | Erickson | Oct. 9, 1883 |
| 2,701,427 | Vironda | Feb. 8, 1955 |
| 2,765,686 | Deline | Oct. 9, 1956 |
| 2,812,676 | Brown | Nov. 12, 1957 |
| 2,829,550 | Hamshaw | Apr. 8, 1958 |
| 2,844,059 | Lee | July 22, 1958 |
| 2,844,980 | Johnson | July 29, 1958 |
| 2,853,722 | Puzine | Sept. 30, 1958 |